Jan. 13, 1953 — A. L. LADO — 2,625,232
WHEEL MOUNTING ASSEMBLY
Filed May 26, 1949 — 2 SHEETS—SHEET 1

INVENTOR.
Anthony L. Lado
BY
Hawg ord and Van Horn
His Attorneys

Jan. 13, 1953 — A. L. LADO — 2,625,232
WHEEL MOUNTING ASSEMBLY
Filed May 26, 1949 — 2 SHEETS—SHEET 2

INVENTOR.
Anthony L. Lado
BY Haygood and Van Horn
His Attorneys

Patented Jan. 13, 1953

2,625,232

UNITED STATES PATENT OFFICE 2,625,232

WHEEL MOUNTING ASSEMBLY

Anthony L. Lado, Rome, N. Y., assignor, by mesne assignments, to Rome Grader Corporation, Rome, N. Y., a corporation of New York Application May 26, 1949, Serial No. 95,540

7 Claims. (Cl. 180—79.2)

This invention relates to vehicle running gear and more particularly to dirigible running gear such as the steering wheels of a land vehicle.

An object of the invention is to provide an improved running gear which will be very efficient in vehicles carrying large loads.

Another object is to provide an improved running gear which will effectively compensate for heavy side thrusts.

Another object is to provide an improved running gear which will be strong and rugged in construction.

Another object is to provide an improved running gear which will be composed of few and simple parts.

Another object is to provide an improved running gear which will carry severe stresses in a plurality of directions.

Another object is to provide an improved running gear which will permit a plurality of motions to be imparted to parts of the apparatus relative other parts thereof, such motions being imparted independently of each other.

Other objects will hereinafter appear.

The invention will be better understood from the description of one practical embodiment, illustrated in the accompanying drawings, in which Figure 1 is a perspective view of the forward end of a motor propelled grader incorporating an embodiment of the present invention in the running gear associated with its two forward wheels;

Figure 1:
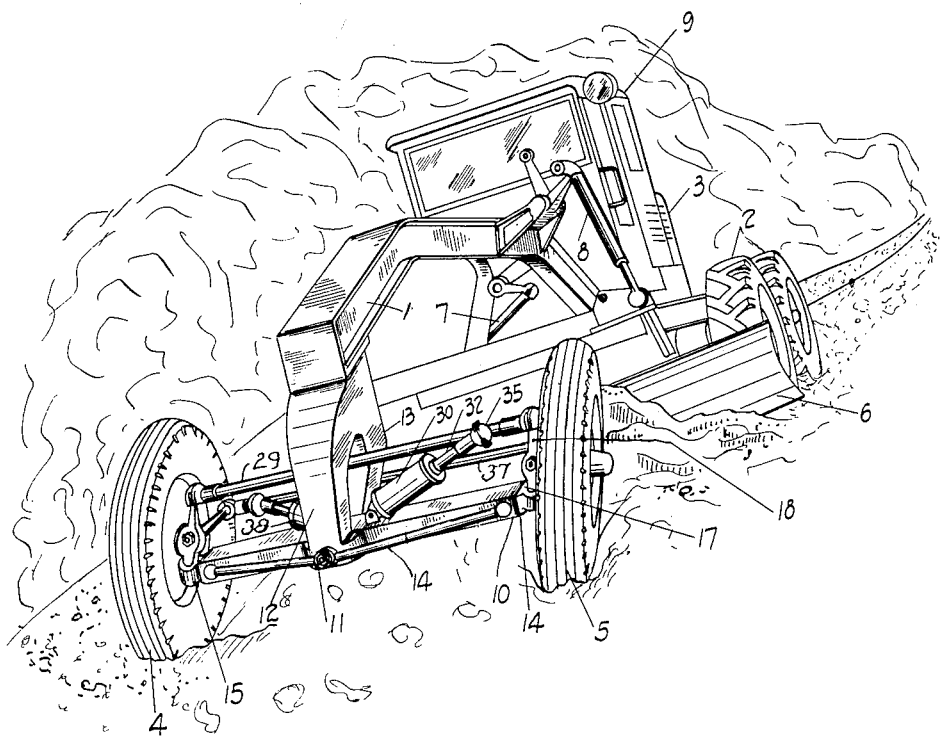
Figure 2:
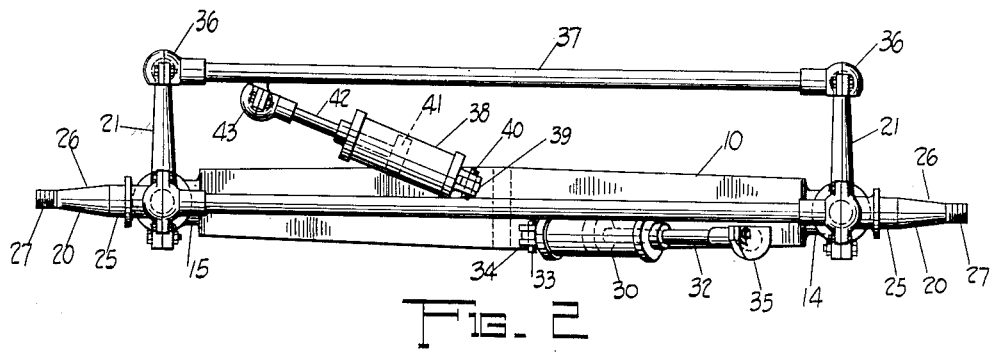
Figure 2 is a plan view, on a larger scale, of the forward axle of the vehicle in Figure 1.
Figure 3:
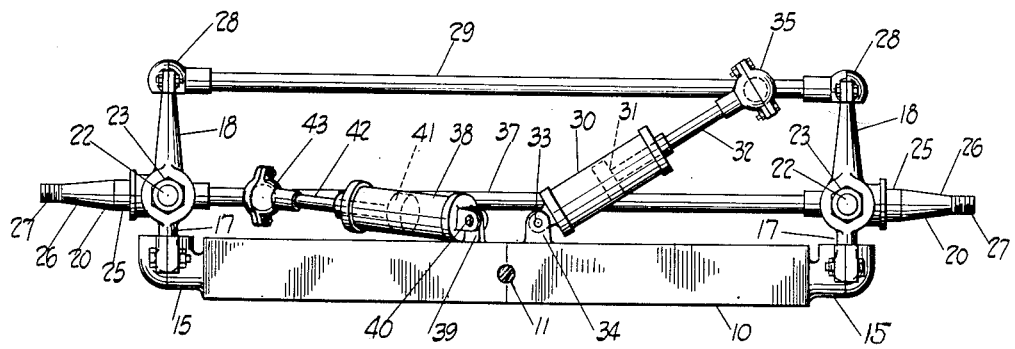
Figure 3 is a front elevational view of the axle and associated parts shown in Figure 2.
Figure 4:
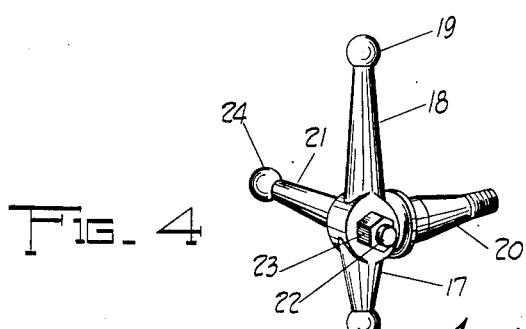
Figure 4 is a perspective view of one of the stub axle brackets shown in the previous figures.

Referring first to Figure 1, the drawings illustrate generally a motor driven grader, of a type now in fairly common use, consisting of a central fore-and-aft frame 1 supported at its rear by propelling wheels 2 driven by a suitable internal combustion motor or other prime mover, conveniently supported on the rear end of the frame 1 and within the cowling 3.

The forward end of the frame is carried upon dirigible front wheels 4 and 5 by which the vehicle may be steered, as is conventional in automobile vehicles generally.

Suspended beneath the frame 1 is a scraper or blade 6 mounted so that it may be swiveled about a vertical axis or tilted about a horizontal axis as by arms and links 7 and 8, which may be actuated from within the cab 9 either manually or mechanically.

It will be evident that when the blade 6 is swung about its vertical axis to a position oblique to the center line of the vehicle and is driven through earth in order to grade the same, heavy side thrusts are imposed upon the wheels 2, 4 and 5, and that these side thrusts are frequently aggravated when the surface upon which the vehicle is traveling is inclined so as to throw the weight of the vehicle toward the side toward which thrust reaction on the blade is acting, this being to the left of Figure 1.

These forces tend to move the vehicle sideways to the left in this figure, and this situation is worse at the front wheels 4 and 5 than at the rear wheels 2 because the latter, carrying the weight of the power plant almost directly above them, have a much firmer grip upon the supporting ground.

To overcome the side thrust on wheels 4 and 5, it has been proposed to tilt these wheels to keep them at all times substantially vertical, and it is to provide a simple means of so tilting them without in any way interfering with their motions for steering that the mechanism illustrated has been devised.

In Figure 1 it will be noted that a vehicle is provided with a transverse axle 10 pivoted about a king pin or bolt 11 which extends substantially horizontally at the plane of the center line of the frame 1 of the vehicle.

This bolt or pin is supported in bearings in the forked downwardly extending ends 12 and 13 of the frame 1 and permits the axle 10 to move freely about it, as required by the irregularities in the ground over which the wheels 4 and 5 must pass.

The pin of itself prevents axle 10 from swiveling around a vertical axis, and is further reinforced in this regard by tie rods or struts 14 pivoted to the ends of pin 11 and attached adjacent the outer ends of axle 10.

Adjacent the ends of axle 10 are ball and socket joints, the sockets 15 of which are shown as unitary with the axle, the ball portion of the joints 16 being formed integrally with a downwardly extending arm 17 of a stub axle bracket which includes, unitarily formed with these parts, an upwardly extending arm 18 terminating in a ball 19, and a stub axle 20. A separate arm 21 has a threaded shank 22 extending through an aperture in the first mentioned unitary part of the bracket and is secured thereto by a nut 23, the arm 21 terminating in a ball 24.

The stub axle 20 is provided with seats 25 and 26 for the reception of the inner races of bearings within the wheels 4 and 5, and terminates in a threaded end 27 for a nut or cap which retains the wheel in place.

The two upper balls 19 are engaged by sockets 28 carried on opposite ends of a tie rod 29, so that the assembly consisting of arms 17 and 18, axle 10 and rod 29 forms at all times a parallelogram maintaining both the stub axles always parallel to each other, although they both may be tilted with respect to the axle 10.

Means for tilting the axles is shown as comprising a hydraulic cylinder 30 containing a piston 31 carried on a piston rod 32, these parts comprising a hydraulic jack.

The head of the cylinder remote from the piston rod is shown as pivoted at 33 upon lugs 34 formed on top of the axle 10, while the piston rod 32 is shown as pivoted through a ball and socket joint 35 to rod 29.

Admission of fluid under pressure to either end of cylinder 30 is controlled by suitable valves (not shown) in cab 9 so that the operator may easily and readily tilt the wheels to any angle he desires and may hold them in adjusted position merely by closing the valves.

Any suitable type of pump may be provided for supplying fluid under pressure and may be driven by any convenient source of power, as by the propelling engine.

Balls 24 are received in sockets 36 carried by the ends of a link, tie bar, or rod 37, shown as mounted behind the axle 10 and parallel thereto, the arms 21 also being parallel, so that they with axle 10 and rod 37 form a parallelogram in a generally horizontal plane.

A cylinder 38 is secured to the top of axle 10 by lugs 39 and pivot 40, the cylinder being equipped with a second hydraulic jack including a piston 41 and piston rod 42 which is connected by a ball and socket joint 43 to rod 37, and the piston 41, like the piston 31, may be moved in either direction by hydraulic pressure applied to either end of cylinder 38, which pressure is controlled by suitable valves in the cab 9, these parts of course being actuated for purposes of steering the front wheels 4 and 5.

The various ball and socket joints, all being universal joints, permit the operation of either the tilting mechanism or the dirigible mechanism independently of the other, or the operation of both simultaneously without interference, and greatly reduce the number of parts which would be necessary if pivoted joints were used, reducing wear, points to be lubricated, and chances of mechanical failure.

While I have shown the illustrated embodiment of my invention in some particularity, obviously many other embodiments, variations, and modifications will readily occur to those skilled in this art, and I do not, therefore, limit myself to the precise details shown and described herein, but claim as my invention all embodiments, modifications and variations coming within the scope of the appended claims.

I claim:

1. Running gear comprising a main axle, two stub axles connected thereto by universal joints, mutually perpendicular arms fixed to each stub axle and each terminating in one element of a universal joint, and two tie rods connecting the corresponding ends of said arms carrying the other elements of said last mentioned universal joints, and independently operable moving means connected to each tie rod.

2. Running gear comprising a main axle, two stub axles connected thereto by universal joints, mutually perpendicular arms fixed to each stub axle and each terminating in one element of a universal joint, and two tie rods connecting the corresponding ends of said arms carrying the other elements of said last mentioned universal joints and independent hydraulic reciprocating means connected with each of said tie rods.

3. Running gear comprising a main axle, two stub axles connected thereto by universal joints, mutually perpendicular arms fixed to each stub axle and each terminating in one element of a universal joint, and two tie rods connecting the corresponding ends of said arms carrying the other elements of said last mentioned universal joints and a hydraulic jack connected with one of said tie rods, a second hydraulic jack connected to the other of said tie rods, and independent control means supplying fluid under pressure to said hydraulic jacks.

4. Running gear comprising a main axle, two stub axles connected thereto by ball and socket joints, mutually perpendicular arms fixed to each stub axle and each terminating in one element of a ball and socket joint, and two tie rods connecting the corresponding ends of said arms carrying the other elements of said last mentioned ball and socket joints and reciprocating means connected with each of said tie rods.

5. A running gear comprising two elements, each consisting of a stub axle and two mutually perpendicular arms, one of the arms having an element of a ball and socket joint at each end, and the other arm one element of a ball and socket joint at one end, a main axle provided adjacent each end with one element of a ball and socket joint engaging the corresponding element on one end of the first mentioned arm, a tie rod having on each end one element of a ball and socket joint engaging the corresponding element on the other end of the first mentioned arm, a second tie rod having on each end an element of a ball and socket joint engaging the corresponding element on the end of the last mentioned arm, and control means connected to each tie rod.

6. A running gear comprising two elements, each consisting of a stub axle and two mutually perpendicular arms, one of the arms having an element of a ball and socket joint at each end, and the other arm one element of a ball and socket joint at one end, a main axle provided adjacent each end with one element of a ball and socket joint engaging the corresponding element on one end of the first mentioned arm, a tie rod having on each end one element of a ball and socket joint engaging the corresponding element on the other end of the first mentioned arm, a second tie rod having on each end an element of a ball and socket joint engaging the corresponding element on the end of the last mentioned arm, and moving means connected with each tie rod, and wheels carried by the stub axles.

7. A running gear comprising two elements, each consisting of a stub axle and two mutually perpendicular arms, one of the arms having an element of a ball and socket joint at each end, and the other arm one element of a ball and socket joint at one end, a main axle provided adjacent each end with one element of a ball and socket joint engaging the corresponding element on one end of the first mentioned arm, a tie rod having on each end one element of a ball and socket joint engaging the corresponding element on the other end of the first mentioned arm, a second tie rod having on each end an element of a ball and socket joint engaging the corresponding element on the end of the last mentioned arm, and a hydraulic piston and cylinder connected with each tie rod, and wheels carried by the stub axles.

ANTHONY L. LADO.

REFERENCES CITED

The following references are of record in the file of this patent:

UNITED STATES PATENTS

| Number | Name | Date |
|---|---|---|
| 1,927,679 | Brick | Sept. 19, 1933 |
| 2,247,345 | Arndt | July 1, 1941 |